United States Patent Office 3,809,763
Patented May 7, 1974

3,809,763
CERTAIN ARYL-DIOXAZOLES USED
AS FUNGICIDES
Klaus Sasse, Schildgen, and Paul-Ernst Frohberger, Leverkusen, Germany, assignors to Bayer Aktiengesellschaft, Leverkusen, Germany
No Drawing. Filed Nov. 26, 1971, Ser. No. 202,668
Claims priority, application Germany, Dec. 5, 1970,
P 20 59 990.0
Int. Cl. A01n 9/22
U.S. Cl. 424—272                3 Claims

ABSTRACT OF THE DISCLOSURE

Fungicidal compositions of and methods of combating fungi using certain 5-aryl-1,3,4-dioxoazole-(thi)ones-(2) and 3-aryl-1,4,2-oxathiazole-(thi)ones-(5) of the formula

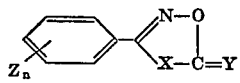
(I)

in which
X is oxygen or sulfur,
Y is oxygen or sulfur,
Z is halogen, methyl or methoxy, and
$n$ is 0, 1 or 2.

---

The present invention relates to and has for its objects the provision of fungicidal compositions of certain 5-phenyl-1,3,4-dioxazole-(thi)ones-(2), or 3-phenyl-1,4,2-oxathiazole-(thi)ones-(5) wherein the phenyl radical may be substituted with up to two halogen, methyl or methoxy groups, in the form of mixtures of such compounds with solid and liquid dispersible carrier vehicles, preferably containing a surface-active agent, and methods for using such compounds in a new way especially for combating fungi with other and further objects becoming apparent from a study of the within specification and accompanying examples.

It is well known that the organomercury compounds are still very widely used for the treatment of plants against pathogenic fungi which infect the plants from the soil and are often transmitted with the seed. Because of the toxicological dangers to the user and to the consumer due to residues in the harvested product, it is extremely desirable to replace these active compounds, despite their high and broad fungicidal effectiveness, by organic compounds free from heavy metals.

It is known that the zinc salt of ethylene-bis-dithiocarbamic acid (Compound A) and the copper salt of 8-hydroxyquinoline (Compound B) are effective against phytopathogenic fungi. The activity of these compounds, however, is not wholly satisfactory, especially if the amounts applied are not very large.

Moreover, loose smut of oats is difficult to control with the previously known active compounds, even the activity of the above-mentioned organomercury compounds is not always satisfactory in this case.

It has now been found that 5-aryl-1,3,4-dioxazole-(thi)ones-(2) or 3-aryl-1,4,2-oxathiazole-(thi)ones-(5) of the general formula

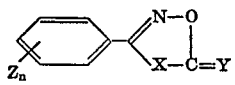
(I)

in which
X is oxygen or sulfur,
Y is oxygen or sulfur,
Z is halogen, methyl or methoxy, and
$n$ is 0, 1 or 2,
exhibit strong fungicidal properties.

Surprisingly, the 5-aryl-1,3,4-dioxazole-(thi)ones-(2) and 3-aryl-1,4,2-oxthiazole-(thi)ones-(5) to be used according to the invention tend to show a considerably better activity against certain fungi than the zinc salt of ethylene-bis-dithiocarbamic acid and the copper salt of 8-hydroxyquinoline known from the prior art which are commonly used as commercial products. The substances which can be used according to the invention represent a valuable enrichment of the art since, in particular, the loose smut of oats which is usually so difficult to control can be effectively combated with the active compounds to be used according to the invention.

As examples of substances which can be used according to the invention, there are listed:

5-phenyl-1,3,4-dioxazolone-(2)
5-(2-chloro-phenyl)-1,3,4-dioxazolone-(2)
5-(4-chloro-phenyl)-1,3,4-dioxazolone-(2)
5-(2,4-dichloro-phenyl)-1,3,4-dioxazolone-(2)
5-(4-bromo-phenyl)-1,3,4-dioxazolone-(2)
5-(4-iodo-pheny)-1,3,4-dioxazolone-(2)
5-(2-methyl-phenyl)-1,3,4-dioxazolone-(2)
5-(4-methyl-phenyl)-1,3,4-dioxozolone-(2)
5-(2-methoxy-phenyl)-1,3,4-dioxazolone-(2)
5-(4-methoxy-phenyl)-1,3,4-dioxazolone-(2)
5-phenyl-1,3,4-dioxazolone-thione-(2)
5-(4-chloro-phenyl-)-1,3,4-dioxazolone-thione-(2)
5-(4-methoxy-phenyl-)-1,3,4-dioxazole-thione-(2)
3-phenyl-1,4,2-oxathiazolone-(5)
3-(4-methyl-phenyl)-1,4,2-oxathiazolone-(5)
3-(2-methoxy-phenyl)-1,4,2-oxathiazolone-(5)
3-(4-methoxy-phenyl)-1,4,2-oxathiazolone-(5)
3-(2-chloro-phenyl)-1,4,2-oxathiazolone-(5)
3-(3-(chloro-phenyl)-1,4,2-oxathiazolone-(5)
3-(4-chloro-phenyl)-1,4,2-oxathiazolone-(5)
3-phenyl-1,4,2-oxathiazole-thione-(5)
3-(4-chloro-phenyl)-1,4,2-oxathiazole-thione-(5)

Some of those active compounds of the Formula I in which X and Y represent oxygen are already known. They may be prepared by the action of phosgene on benzhydroxamic acids, for example in chlorobenzene as solvent (Chem. Ber. 84, 688 (1951); Tetrahedron Letters 1968, 319). Those substances of this series which are not yet known can be prepared in analogous manner. The compounds of the Formula I, in which X stands for oxygen and Y stands for sulfur, have been partially described without experimental details. (Tetrahedron Letters 1968, 319). They may be obtained by the action of thiophosgene on benzhydroxamic acids. It has now been found that this reaction is preferably carried out in inert solvents in the presence of twice the equimolar amount of an acid-binding agent. The same procedure may be used for preparing the hitherto unknown 3-aryl-1,4,2-oxathiazole-(thi)ones-(5) of the Formula I, in which X stands for sulfur and Y stands for oxygen or sulfur, from benzthiohydroxamic acid and phosgene or thiophosgene. The benzhydroxamic acids or -thiohydroxamic acids required as starting products are for the most part known. Any which have still not been described can be prepared by processes known in the literature.

The reaction of the (thio)hydroxamic acids with phosgene or thio-phosgene is preferably carried out in a diluent. As such, all organic solvents are suitable which do not themselves react with phosgene or thiophosgene, for example hydrocarbons or chlorinated hydrocarbons, such as benzene, toluene, chlorobenzene, dichloromethane, chloroform or carbon tetrachloride; ethers, such as diethyl ether, tetrahydrofurane or dioxane; ketones, such as acetone or cyclohexanone. The reaction can, however, also be carried out in water. In the preparation of the compounds of the Formula I in which at least one of X and Y denotes a sulfur atom, an acid-binding agent is preferably used for binding the hydrogen chloride liberated in the reaction. Suitable for this purpose are inorganic bases such as alkali metal and alkaline earth metal hydroxides and carbonates, and tertiary amines, which are preferably used in at least twice the equimolar amount. The reaction can, however, also be carried out in an excess of this base, for example pyridine, as solvent. The reactions between the (thio)hydroxamic acids and (thio)phosgene are in general carried out in the temperature range between about $-10°$ and $+140°$ C. The working up of the reaction mixtures may take place in customary manner by filtration or evaporation of the solutions obtained.

The substances to be used according to the invention possess a high fungicidal activity. Thus, they are particularly effective against the genera Phytophthora, Thielaviopsis, Fusarium, Sclerotinia, Tilletia, Ustilago, Sclerotium, Verticillium, Piricularia, as well as against mold fungi; moreover, they are effective against Rhizoctonia- and Pythium species. The relative nontoxicity of the compounds according to the invention and their good toleration by skin and mucous membranes permit their practical use against injurious fungi. Since, moreover, in the concentrations and applied amounts necessary for the control of fungi they generally do not harm cultivated plants, they are suitable for use as fungitoxic crop protection agents. They are free from accumulating heavy metals, of which mercury is fungicidally the most effective but toxicologically the most dangerous.

The compounds are also active against fungi which infect rice plants, such as *Piricularia oryzae*. In addition, an activity against mold fungi is exhibited, as mentioned above.

The compounds according to the invention can be used with particular advantage for the dressing of seed, especially cereal seed, and specifically against the loose smut of oats which is difficult to control.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers including inert organic solvents, such as aromatic hydrocarbons (e.g., benzene, toluene, xylene, alkyl naphthalenes, etc.), halogenated, especially chlorinated, aromatic hydrocarbons (e.g., chlorobenzenes), cycloalkanes (e.g., cyclohexane, etc.), paraffins (e.g., petroleum or mineral oil fractions), chlorinated aliphatic hydrocarbons (e.g., methylene chloride, etc.), alcohols (e.g., methanol, ethanol, propanol, butanol, glycol, etc.) as well as ethers and esters thereof (e.g., glycol monomethyl ether, etc.), amines (e.g., ethanolamine, etc.), amides (e.g., dimethyl formamide, etc.), sulfoxides (e.g., dimethyl sulfoxide, etc.), ketones (e.g., acetone, methyl ethyl ketone, methyl isobutyl ketone, cyclohexanone, etc.), and/or water: as well as inert dispersible finely divided solid carriers, such as ground natural minerals (e.g., kaolins, alumina, silica, chalk, i.e., calcium carbonate, talc, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as nonionic and/or anionic emulsifying agents (e.g., polyethylene oxide esters of fatty acids, polyethylene oxide ethers of fatty alcohols, alkyl sulfates, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides or acaricides, insecticides, herbicides, bactericides, nematicides, fertilizers, growth regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.0001–5%, preferably 0.001 to 1% weight of the mixture. Thus, the present invention contemplates overall compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.1–95%, and preferably 0.5–95% by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

In the case of seed treatment, in general amounts of active compound of 0.01 to 10 g., preferably 0.05 to 5 g., per kilogram of seed are applied as a seed dressing.

For soil treatment, in general amounts of active compound of 1 to 500 g., preferably 10 to 200 g. are applied per cubic meter of soil. The concentrations of active compound in the ready-to-apply preparations may vary very greatly. In general, they are from 0.0001 to 95%.

Furthermore, the present invention contemplates methods of selectively killing, combating or controlling pests, e.g. fungi which comprise applying to at least one of correspondingly (a) such fungi, and (b) the corresponding habitat thereof, i.e., the locus to be protected, a correspondingly combative or toxic amount, i.e. a fungicidally effective amount, of the particular active compound of the invention alone or together with a carrier vehicle as noted above. The instant formulations or compositions are applied in the usual manner, for instance by spraying, atomizing, vaporizing, scattering, dusting, watering, sprinkling, pouring, via dressings, incrustations, and the like.

It will be realized, of course, that the concentration of the particular active compound utilized in admixture with the carrier vehicle will depend upon the intended application. Therefore, in special cases, it is possible to go above or below the aforementioned concentration ranges. The unexpected superiority and outstanding fungicidal activity of such active compounds usable according to the present invention is illustrated, without limitation, by the following examples.

EXAMPLE 1

Agar plate test

Test for fungitoxic effectiveness and breadth of the activity spectrum.

Solvent: Acetone
Parts by weight: 100

To produce a suitable preparation of the active compound, 1 part by weight of the active compound is taken up in the stated amount of solvent.

To potato dextrose agar which has been liquefied by heating there is added the preparation of the active compound in such an amount that the desired concentration of active compound is set up therein. After thorough shaking to achieve a uniform dispersion of the active compound, the agar is poured into Petri dishes under sterile conditions. When the mixture of substrate and active compound has solidified, test fungi from pure cultures are inoculated onto it in small discs of 5 mm. diameter. The Petri dishes remain at 20° C. for 3 days for incubation.

After this time, the inhibiting action of the active compound on the mycelium growth is determined in categories, taking into account the untreated control. 0 means no mycelium growth, either on the treated substrate or on the inoculum; the symbol — means mycelium growth on the inoculum only, no spread to the treated substrate; and the symbol + means mycelium growth from the inoculum onto the treated substrate, similar to the spread to the untreated substrate of the control.

The active compounds, the concentration of the active compounds, the test fungi and the inhibition effects achieved can be seen from the following table:

TABLE 1.—AGAR PLATE TEST

| Active compound | | Concentration of active compound in the substrate in mg./kg. | Corticium rolfsii | Sclerotinia sclerotiorum | Verticillium alboatrum | Thielaviopsis basicola | Phytophthora cactorum | Fusarium culmorum | Fusarium oxysporum | Fusarium solani f. pisi |
|---|---|---|---|---|---|---|---|---|---|---|
| Untreated | | | + | + | + | + | + | + | + | + |
| CH₃—NH—C(=S)—S\\Zn/S—C(=S)—NH—CH₃ (known) | (A) | 100 | + | + | + | 0 | | + | + | + |
| C₆H₅—C(=N—O—)—O—C(=S)— (benzene ring with C=N-O-C(=S)-O ring) | (2) | 100 | 0 | 0 | + | 0 | 0 | + | + | + |
| C₆H₅—C(=N—O—)—O—C(=O)— | (1) | 100 | — | 0 | + | — | — | + | + | + |
| C₆H₅—C(=N—O—)—O—C(=O)— | (3) | 100 | 0 | 0 | 0 | 0 | 0 | 0 | 0 | 0 |
| C₆H₅—C(=N—O—)—S—C(=S)— | (4) | 100 | 0 | 0 | + | — | — | + | + | + |
| Cl—C₆H₄—C(=N—O—)—S—C(=O)— | (5) | 100 | 0 | 0 | + | — | 0 | + | + | + |
| Cl—C₆H₄—C(=N—O—)—S—C(=O)— (meta-Cl) | (6) | 100 | 0 | 0 | 0 | 0 | 0 | + | — | — |

TABLE I—Continued

| Active compound | | Concentration of active compound in the substrate in mg./kg. | Corticium rolfsii | Sclerotinia sclerotiorum | Verticillium alboatrum | Thielaviopsis basicola | Phytophthora cactorum | Fusarium culmorum | Fusarium oxysporum | Fusarium solaniƒ pis· |
|---|---|---|---|---|---|---|---|---|---|---|
| [2-Cl-phenyl-C(=N-O-)-S-C(=O) structure] | (7) | 100 | 0 | 0 | + | 0 | 0 | + | + | + |
| [4-CH₃-phenyl-C(=N-O-)-S-C(=O) structure] | (8) | 100 | 0 | 0 | + | 0 | − | + | + | + |

EXAMPLE 2

Seed dressing test/bunt of wheat (seed-borne mycosis)

To produce a suitable dry dressing, the active compound is extended with a mixture of equal parts by weight of talc and kieselguhr to give a finely powdered mixture with the desired concentration of the active compound.

Wheat seed is contaminated with 5 g. of the chlamydospores of *Tilletia caries* per kg. of seed. To apply the dressing, the seed is shaken with the dressing in a closed glass flask. The seed, on moist loam under a cover of a layer of muslin and 2 cm. of moderately moist compost soil, is exposed to optimum germination conditions for the spores for 10 days at 10° C. in a refrigerator.

The germination of the spores on the wheat grains, each of which is contaminated with about 100,000 spores, is subsequently determined microscopically. The smaller the number of spores which have germinated, the more effective is the active compound.

The active compounds, the concentrations of the active compounds in the dressing, the amounts of dressing used and the percentage spore germination can be seen from the following Table 2:

TABLE 2.—SEED DRESSING TEST/BUNT OF WHEAT

| Active compounds | | Concentration of active compound in the dressing in percent by weight | Applied amount of dressing in g./kg. seed | Spore germination in percent |
|---|---|---|---|---|
| Non-dressed | | | | >10 |
| [CH₃-NH-C(=S)-S / CH₃-NH-C(=S)-S \ Zn] | (A) | 10 | 1 | 5 |
| (known) | | | | |
| [Cl-phenyl-C(=N-O-)-O-C(=S) structure] | (2) | 30 | 1 | 0.5 |
| [phenyl-C(=N-O-)-O-C(=O) structure] | (1) | 30 | 1 | 0.05 |
| [phenyl-C(=N-O-)-S-C(=O) structure] | (3) | 30 | 1 | 0.5 |
| [Cl-phenyl-C(=N-O-)-S-C(=O) structure] | (5) | 30 | 1 | 0.5 |
| [2-Cl-phenyl-C(=N-O-)-S-C(=O) structure] | (6) | 30 | 1 | 0.05 |
| [2-OCH₃-phenyl-C(=N-O-)-S-C(=O) structure] | (9) | 30 | 1 | 0.5 |

EXAMPLE 3

Dressing test in field trial/loose smut of oats (seed-borne mycosis)

To produce a suitable dry dressing, the active compound is extended with talc and the mixture with the desired concentration of active compound is ground to a fine-grained, highly adhesive powder.

For dressing, in each case 100 g. of oat seed which is infected by a natural infection with loose smut of oats (*Ustilago avenae*) is shaken with the dressing for three minutes in a closed glass flask. In the spring, into each of four plots each measuring 5 square meters there are sown 100 g. of seed. After about 12 weeks, the oats flower and show healthy and diseased panicles; on average, 2,400 on each plot, that is to say about 9,600 for each test series.

At this time, the number of diseased panicles is determined as a percentage of the total number of developed panicles. 0% means that no diseased panicles are present; 100% means that all the panicles are diseased. The fewer diseased panicles are formed, the more effective is the active compound.

The active compounds, the concentrations of the active compounds in the dressing, the amounts of dressing used and the percentage of diseased panicles can be seen from Table 3:

TABLE 3.—DRESSING TEST IN FIELD TRIAL/LOOSE SMUT OF OATS

| Active compounds | | Concentration of active compound in the dressing in percent by weight | Applied amount of dressing in g./kg. seed | Number of smutted panicles as a percentage of the total number of developed panicles |
|---|---|---|---|---|
| Non-dressed | | | | 45.55 |
| Phenylmercury acetate (known) | (C) | 2.5 | 3 | 2.77 |
| | | 4.0 | 3 | 1.72 |
| Copper 8-oxyquinoline (known) | (B) | 15 | 3 | 7.72 |
| 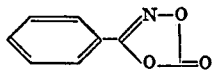 | (1) | 3 | 3 | 0.37 |
| | | 5 | 3 | 0.17 |
| | | 10 | 3 | 0.07 |
| 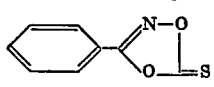 | (2) | 3 | 3 | 1.08 |
| | | 5 | 3 | 0.36 |
| | | 10 | 3 | 0.15 |
| 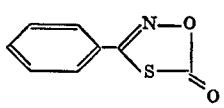 | (5) | 3 | 3 | 2.17 |
| | | 5 | 3 | 0.96 |
| | | 10 | 3 | 0.35 |

As stated above, the compounds to be used may be prepared in known manner (Chem. Ber. 84, 688 (1951)). The methods illustrated below have given good results.

EXAMPLE 4

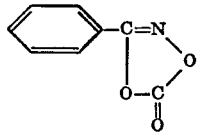 (1)

27.2 g. (0.2 mole) of benzhydroxamic acid and 50.8 g. (0.4 mole) of hexahydrodimethylaniline are dissolved in 400 ml. of benzene. At 15 to 20° C., 22 g. (0.22 mole) of phosgene are introduced and stirring is subsequently effected for one hour at room temperature. The reaction mixture is washed twice with water, and the benzene solution is dried and evaporated in a vacuum. As residue, there remain 31 g. (95% of theory) of 5-phenyl-1,3,4-dioxazolone-(2); M.P. 63° C. (from petroleum ether).

EXAMPLE 5

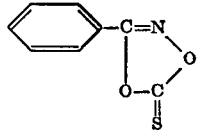 (2)

27.2 g. (0.2 mole) of benzhydroxamic acid are dissolved in 250 ml. of dioxane. To this there are added 23 g. (0.2 mole) of thiophosgene, and 40.4 g. (0.4 mole) of triethylamine are then added dropwise at 10 to 15° C., with cooling. The mixture is stirred for 2 hours at room temperature and then diluted with a 3-fold volume of water. The separated crystals are filtered off with suction, washed with water and dried. Yield: 27 g. (75.5% of theory) of 5-phenyl-1,3,4-dioxazolethone-(2); M.P. 49° C. (from ligroin).

EXAMPLE 6

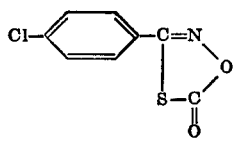 (3)

30.4 g. (0.2 mole) of benzthiohydroxamic acid are dissolved in a solution of 12 g. (0.3 mole) sodium hydroxide in 250 ml. of water. With cooling, at 5 to 10° C., while simultaneously adding dropwise a solution of a further 8 g. (0.2 mole) of sodium hydroxide in 50 ml. water, phosgene is introduced until the mixture reacts neutral. The separated crystals are filtered off with suction, washed with water and dried. Yield: 22 g. (61.5% of theory) of 3-phenyl-1,4,2-oxathiazolone-(5); M.P. 97° C. (from ethanol).

The other compounds may be prepared in corresponding manner.

It will be appreciated that the instant specification and examples are set forth by way of illustration and not limitation, and that various modifications and changes may be made without departing from the spirit and scope of the present invention.

What is claimed is:

1. A method of combating seed borne mycoses which comprises applying to infected seeds a fungicidally effective amount of a compound of the formula

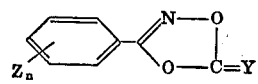

in which

Y is oxygen or sulfur,

Z is halogen, methyl or methoxy, and $n$ is 0, 1 or 2.

2. The method according to claim 1, wherein the compound is 5-phenyl-1,3,4-dioxazolone-(2) of the formula
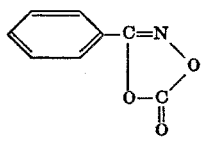
3. The method according to claim 1 wherein the compound is 5-phenyl-1,3,4-dioxazole-thione-(2) of the formula
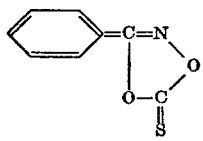
References Cited
FOREIGN PATENTS
974,550  11/1964  Great Britain.
OTHER REFERENCES
Tetrahedron Letters, 1968, pp. 319–24.
ALBERT T. MEYERS, Primary Examiner
L. SCHENKMAN, Assistant Examiner
U.S. Cl. X.R.
424—270

UNITED STATES PATENT OFFICE
CERTIFICATE OF CORRECTION

Patent No. 3,809,763  Dated May 7, 1974

Inventor(s) Klaus Sasse et al.

It is certified that error appears in the above-identified patent and that said Letters Patent are hereby corrected as shown below:

Col. 5, Table 1, Compound (3), correct formula to read as follows: 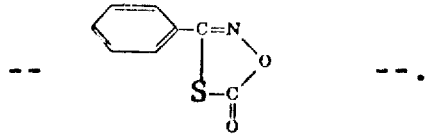

Col. 11, line 14 (claim 3), correct formula to read as follows: 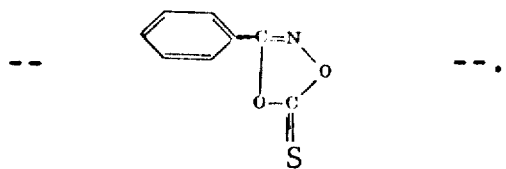

Signed and sealed this 5th day of November 1974.

(SEAL)
Attest:

McCOY M. GIBSON JR.
Attesting Officer

C. MARSHALL DANN
Commissioner of Patents